(12) United States Patent
Oza

(10) Patent No.: US 11,595,117 B2
(45) Date of Patent: Feb. 28, 2023

(54) TIMING ACQUISITION METHOD FOR FASTER BEAM, GATEWAY, SATELLITE AND INTER-NETWORK HANDOVERS

(71) Applicant: HUGHES NETWORK SYSTEMS, LLC, Germantown, MD (US)

(72) Inventor: Rajeev Gautam Oza, Germantown, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 275 days.

(21) Appl. No.: 17/138,888

(22) Filed: Dec. 30, 2020

(65) Prior Publication Data

US 2022/0209860 A1    Jun. 30, 2022

(51) Int. Cl.
    *H04B 7/185*    (2006.01)
    *H04W 56/00*    (2009.01)

(52) U.S. Cl.
    CPC ..... *H04B 7/18589* (2013.01); *H04B 7/18573* (2013.01); *H04B 7/18582* (2013.01); *H04B 7/18584* (2013.01)

(58) Field of Classification Search
    CPC ............ H04B 7/18589; H04B 7/18573; H04B 7/18582; H04B 7/18584; H04B 7/18513; H04W 56/0075
    See application file for complete search history.

(56) References Cited

U.S. PATENT DOCUMENTS

| | | | |
|---|---|---|---|
| 6,411,802 B1* | 6/2002 | Cardina | H04B 1/74 455/426.2 |
| 6,788,953 B1* | 9/2004 | Cheah | H04W 88/02 455/552.1 |
| 6,826,514 B1* | 11/2004 | Antico | H04B 7/18573 702/187 |
| 2002/0141544 A1* | 10/2002 | Brown | H04W 52/18 379/1.01 |
| 2003/0056140 A1* | 3/2003 | Taylor | G06F 11/0709 714/4.1 |
| 2003/0153312 A1* | 8/2003 | Lee | H04W 36/32 455/436 |
| 2005/0070223 A1 | 3/2005 | Camp, Jr. et al. | |
| 2005/0097032 A1* | 5/2005 | Benco | G06Q 40/02 705/38 |
| 2007/0263070 A1* | 11/2007 | Harris | H04W 36/02 348/14.02 |
| 2010/0171658 A1 | 7/2010 | Dooley et al. | |

(Continued)

OTHER PUBLICATIONS

International Search Report and Written Opinion issued in Application No. PCT/US2021/065503, dated Mar. 30, 2022.

*Primary Examiner* — Dominic E Rego
(74) *Attorney, Agent, or Firm* — Potomac Technology Law, LLC

(57) ABSTRACT

A system and method are disclosed for synchronizing timing for a terminal in a satellite communication system. Upon detecting a service interruption, first timing markers are extrapolated from timing information received prior to the service interruption. Second timing markers are also extrapolated from timing information received subsequent to the service interruption. Timing for the terminal is then synchronized with the gateway based on a timing difference between the first timing markers and the second timing markers.

20 Claims, 8 Drawing Sheets

(56) References Cited

U.S. PATENT DOCUMENTS

| | | |
|---|---|---|
| 2013/0244719 A1 | 9/2013 | Nukala et al. |
| 2013/0315136 A1 | 11/2013 | Bhaskar et al. |
| 2015/0358861 A1* | 12/2015 | Chuberre ............... H04B 7/195 |
| | | 455/13.1 |
| 2017/0227567 A1* | 8/2017 | Son ...................... G06F 3/0673 |
| 2019/0014389 A1* | 1/2019 | Medina ............. H04N 21/6473 |
| 2020/0196263 A1 | 6/2020 | Heyn et al. |

* cited by examiner

TIMING ACQUISITION METHOD FOR FASTER BEAM, GATEWAY, SATELLITE AND INTER-NETWORK HANDOVERS

BACKGROUND INFORMATION

High throughput satellite (HTS) systems are used to provide voice and data access in areas that may lack cellular or landline infrastructure. HTS systems typically employ multiple gateways (or satellite hubs) to provide service to customers by utilizing very small aperture terminals (VSATs, or simply "terminals"). Terminals and gateways are often installed at a fixed or permanent location, thereby enabling satellites to transmit data back and forth via "beams". In a communication system that has mobile terminals, there will be need for the terminals to switch from beam to beam within a satellite, switch from one satellite to the other as it moves through the coverage area. Terminals that are initially installed at a fixed or known location (and registered as being at that location) may be moved to a different location by an owner or operator of the terminal. Service may continue to operate in a relatively normal same manner due to the footprint of the coverage beam, or using an adjacent beam. Some of these switches also involve switching gateways. In addition, gateway switch can happen for stationary terminals due to several reasons, including diversity of radio frequency (RF) path. Upon such a switch that causes change in path delay to and from the terminal to the gateway, there is a need to determine the new path delay for the terminal to start using bandwidth resources using the new path.

In existing systems, terminals use bootstrap Aloha to get timing feedback from gateway upon detecting a switch. The TDMA based Aloha channel/RACH (Random Access Channel) can be used for control messages and latency sensitive traffic. For example, many systems transmit control messages on an Aloha/RACH channel, and transmit data (including voice) on a channel assigned based on demand or predictive use. Some systems also transmit a small high priority data on the Aloha/RACH channel. Since only one terminal can successfully transmit in the same time and frequency, collisions can occur when using the Aloha/RACH channel. Thus, bursts allocated to Aloha can only be used with an efficiency of about 10-15% with a certain acceptable collision rate, while regular TDMA achieves much higher efficiencies. Even if slotted Aloha is used, the maximum throughput is only about 36.8%, given 1:1 load density. Generally closed loop timing allows the terminal to operate even after it has been moved, despite the timing offsets calculated to achieve synchronization change. However, closed loop timing cannot synchronize a terminal timing with a change in communication path associated with a switch in gateways, beams, or satellites.

BRIEF SUMMARY

Methods and apparatus are disclosed for synchronizing timing for a satellite terminal responsive to a service interruption or change in a communication path. According to an embodiment, the apparatus includes a terminal; and one or more processors coupled to the terminal. The one or more processors are configured to perform operations including: detecting a service interruption at the terminal; extrapolating one or more first timing markers from timing information received at the terminal prior to the service interruption; extrapolating one or more second timing markers from timing information received at the terminal subsequent to the service interruption; synchronizing a timing of the terminal with a gateway based on a timing difference between the one or more first timing markers and the one or more second timing markers; and transmitting and receiving data by the terminal using the synchronized timing.

According to another embodiment, the method includes: detecting a service interruption at a terminal; extrapolating one or more first timing markers from timing information received at the terminal prior to the service interruption; extrapolating one or more second timing markers from timing information received at the terminal subsequent to the service interruption; synchronizing a timing of the terminal with a gateway based on a timing difference between the one or more first timing markers and the one or more second timing markers; and transmitting and receiving data by the terminal using the synchronized timing.

The foregoing summary is only intended to provide a brief introduction to selected features that are described in greater detail below in the detailed description. As such, this summary is not intended to identify, represent, or highlight features believed to be key or essential to the claimed subject matter. Furthermore, this summary is not intended to be used as an aid in determining the scope of the claimed subject matter.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DETAILED DESCRIPTION

Methods and systems are described herein for acquiring timing information responsive to service interruptions. In the following description, for purposes of explanation, numerous specific details are set forth in order to provide a thorough understanding of the disclosed embodiments. It will become apparent, however, to one skilled in the art that various embodiments may be practiced without these specific details or with an equivalent arrangement. In other instances, well-known structures and devices are shown in block diagram form in order to avoid unnecessarily obscuring the various embodiments.

For the purposes of this disclosure, timing information can include any combination of timing markers, indicators, messages, frame identifiers, frame information, etc. that can be used to synchronize timing between at least a terminal and components on a satellite network such as a gateway. Embodiments described herein include acquiring and/or determining a synchronized timing for a terminal subsequent to a service interruption, based on timing information acquired/determined prior to the service interruption. This is achieved without the need for conventional time-consuming timing acquisition procedures, such as using bootstrap ALOHA messaging or equivalent. The disclosed embodiments allow terminals to synchronize or establish timing with the satellite network without having to request (and wait for) feedback from the gateway, which enables terminals to be able to start transmitting sooner than they would otherwise. This also limits using ALOHA or similar transmissions channels that are prone to collision, and also helps speed up handovers and communication path changes, as further described herein. As a result, any multi gateway spot beam satellite-based communication system comprising fixed terminals, aero terminals, maritime terminals, other mobile terminals, etc. are able to switch beams, satellites, or gateways, as they move around in a satellite network, faster than they would be able to without the disclosed embodiments. Terminals are able to reacquire timing quicker after a gateway switchover resulting in different communication paths, which can be especially useful in systems where satellite ephemeris data is either not available or is not transmitted to all the gateways and over the air to all the terminals. Thus, in instances where there is a service interruption or in any case where timing must be re-synchronized other than a new or initial connection, previous timing information from a past communication path can be leveraged to derive new timing information for a new communication path, without using traditional methods.

Figure 1:
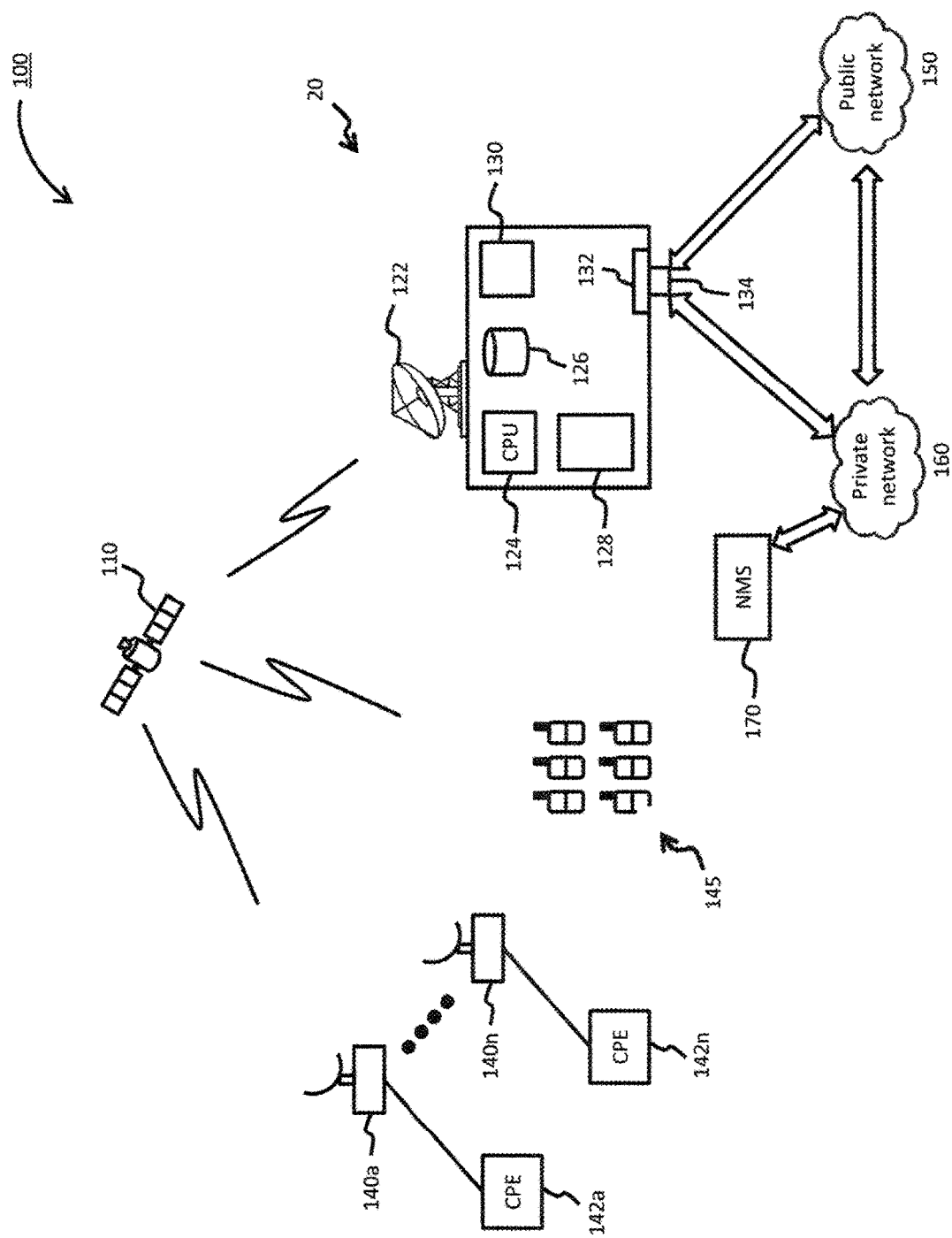
FIG. 1 is a diagram of a satellite system for synchronizing timing of a terminal responsive to a service interruption, according to one or more embodiments.

FIG. 1 illustrates a satellite communication system 100 capable of providing voice and data services. The satellite communication system 100 includes a satellite 110 that supports communications among a number of gateways 120 (only one shown) and multiple stationary satellite terminals 140a-140n. Each satellite terminal (or terminal) 140 can be configured for relaying traffic between its customer premise equipment (CPEs) 142a-142n (i.e., user equipment), a public network 150 such as the internet, and/or its private network 160. Depending on the specific embodiment, the customer premise equipment 142 can be a desktop computer, laptop, tablet, cell phone, etc. Customer premise equipment 142 can also be in the form of connected appliances that incorporate embedded circuitry for network communication can also be supported by the satellite terminal (or terminal) 140. Connected appliances can include, without limitation, televisions, home assistants, thermostats, refrigerators, ovens, etc. The network of such devices is commonly referred to as the internet of things (IoT).

According to an exemplary embodiment, the terminals 140 can be in the form of very small aperture terminals (VSATs) that are mounted on a structure, habitat, etc. Depending on the specific application, however, the terminal 140 can incorporate an antenna dish of different sizes (e.g., small, medium, large, etc.). The terminals 140 typically remain in the same location once mounted, unless otherwise removed from the mounting. According various embodiments, the terminals 140 can be mounted on mobile platforms that facilitate transportation thereof from one location to another. Such mobile platforms can include, for example, cars, buses, boats, planes, etc. The terminals 140 can further be in the form of transportable terminals capable of being transported from one location to another. Such transportable terminals are operational only after arriving at a particular destination, and not while being transported.

As illustrated in FIG. 1, the satellite communication system 100 can also include a plurality of mobile terminals 145 that are capable of being transported to different locations by a user. In contrast to transportable terminals, the mobile terminals 145 remain operational while users travel from one location to another. The terms user terminal, satellite terminal, terminal may be used interchangeably herein to identify any of the foregoing types. The gateway 120 can be configured to route traffic from stationary, transportable, and mobile terminals (collectively terminals 140) across the public network 150 and private network 160 as appropriate. The gateway 120 can be further configured to route traffic from the public internet 150 and private network 160 across the satellite link to the appropriate terminal 140. The terminal 140 then routes the traffic to the appropriate customer premise equipment (CPE) 142.

According to at least one embodiment, the gateway 120 can include various components, implemented in hardware, software, or a combination thereof, to facilitate communication between the terminals 140 and external networks 150, 160 via the satellite 110. According to an embodiment, the gateway 120 can include a radio frequency transceiver 122 (RFT), a processing unit 124 (or computer, CPU, etc.), and a data storage unit 126 (or storage unit). While generically illustrated, the CPU 124 can encompass various configurations including, without limitations, a personal computer, laptop, server, etc. As used herein, a transceiver corresponds to any type of antenna unit used to transmit and receive signals, a transmitter, a receiver, etc. The RFT 122 is useable to transmit and receive signals within a communication system such as the satellite communication system 100 illustrated in FIG. 1. The data storage unit 126 can be used, for example, to store and provide access to information pertaining to various operations in the satellite communication system 100. Depending on the specific implementation, the data storage unit 126 (or storage unit) can be configured as a single drive, multiple drives, an array of drives configured to operate as a single drive, etc.

According to other embodiments, the gateway 120 can include multiple processing units 124 and multiple data storage units 126 in order to accommodate the needs of a particular system implementation. Although not illustrated in FIG. 1, the gateway 120 can also include one or more workstations 125 (e.g., computers, laptops, etc.) in place of, or in addition to, the one or more processing units 124. Various embodiments further provide for redundant paths for components of the gateway 120. The redundant paths can be associated with backup components capable of being seamlessly or quickly switched in the event of a failure or critical fault of the primary component.

According to the illustrated embodiment, the gateway 120 includes baseband components 128 which operate to process signals being transmitted to, and received from, the satellite 110. For example, the baseband components 128 can incorporate one or more modulator/demodulator units, system timing equipment, switching devices, etc. The modulator/demodulator units can be used to generate carriers that are transmitted into each spot beam and to process signals received from the terminals 140. The system timing equipment can be used to distribute timing information for synchronizing transmissions from the terminals 140. Timing information can include delay parameters and/or timing offsets associated with the gateway 120 and can be distributed or transmitted in packets such as a synchronized frame numbering packet (SFNP) or similar timing markers.

According to an embodiment, a fault management unit 130 can be included in the gateway 120 to monitor activities and output one or more alerts in the event of a malfunction in any of the gateway components. The fault management unit 130 can include, for example, one or more sensors and interfaces that connect to different components of the gateway 120. The fault management unit 130 can also be configured to output alerts based on instructions received from a remotely located network management system 170 (NMS). The NMS 170 maintains, in part, information (configuration, processing, management, etc.) for the gateway 120, and all terminals 140 and beams supported by the gateway 120. The gateway 120 can further include a network interface 132, such as one or more edge routers, for establishing connections with a terrestrial connection point 134 from a service provider. Depending on the specific implementation, however, multiple terrestrial connection points 134 may be utilized.

Figure 2:
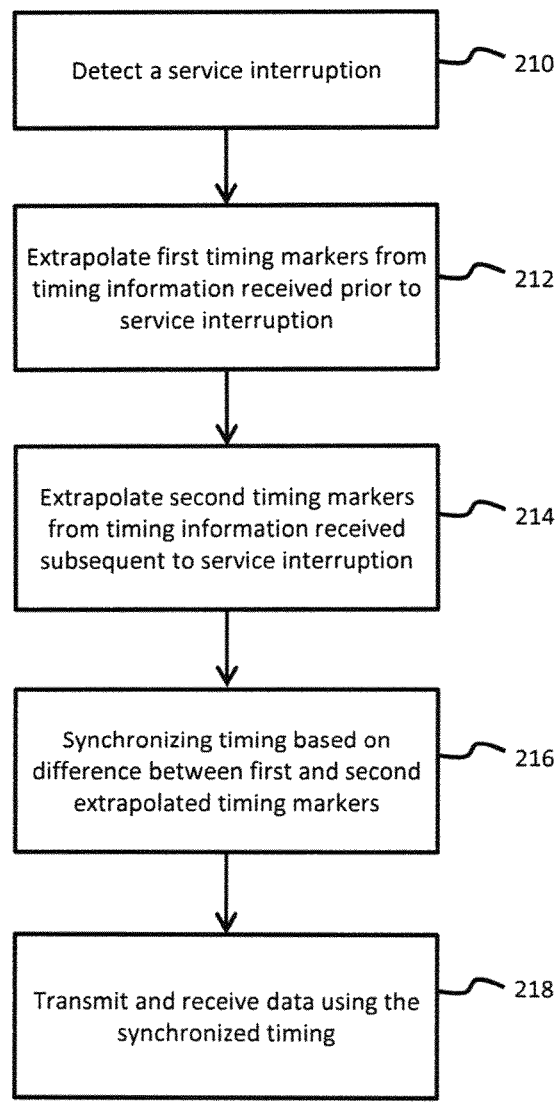
FIG. 2 is a flowchart of a process for synchronizing timing after a service interruption, according to one or more embodiments.

FIG. 2 is a flowchart of a process for synchronizing timing after service interruptions, according to one or more embodiments. The process may be performed by components similar to those illustrated in satellite communication system 100, such as a terminal in communication with a gateway via a satellite. At 210, a service interruption is detected for a terminal in the satellite communication system. The terminal can include any terminal such as terminals 140 or 145 illustrated in satellite communication system 100, including those that are stationary, mobile, transportable, etc. Further, the service interruption can be associated with a variety of conditions including, but not limited to, a communication interruption of an existing beam, a switch between beams served by a same gateway, a switch between beams served by different gateways, a switch between beams from different satellites served by the same gateway, a switch between beams from different satellites served by different gateways, a switch to a different network. These scenarios are further described with respect to FIG. 3. Any of these scenarios (or other scenarios envisioned by those of ordinary skill in the art in light of this disclosure) may require a timing adjustment and, therefore, trigger the operations described herein.

At 212, one or more first timing markers are extrapolated from timing information received prior to the service interruption. According to an embodiment, the timing information can be contained in superframe numbering packets (SFNPs) received at the terminal. The SFNPs are transmitted from the gateway serving a satellite to which the terminal is serviced via one or more beams. The SFNPs may be transmitted within a short time interval of the beginning of a superframe. This short time interval can include a gateway timing offset. The gateway timing offset can differ depending on different gateways and related entities, as well as different information that is transmitted, internal gateway delays, etc. According to various embodiments, the timing information can include a delay parameter that indicates the gateway timing offset associated with a previous SFNP. For example, each subsequent SFNP can include a gateway timing offset of the previous SFNP, thereby indicating a time period between a beginning of a superframe and the transmission of the previous SFNP within the superframe.

In an exemplary embodiment, a "delay field" of the SFNP contains the delay parameter. Thus, the one or more first timing markers can be extrapolated from delay parameters in SFNPs received prior to the service interruption. For example, based on the delay parameters in two or more SFNPs, additional timing markers can be extrapolated by the terminal and used to synchronize timing between the terminal and the gateway. The extrapolation includes adding an integer number of superframe time intervals to the last (or previous) accurate SFNP received prior to the service interruption. Further, at 214, one or more second timing markers are extrapolated from timing information received subsequent to the service interruption. For example, delay parameters may be obtained from SFNPs received at the terminal subsequent to the service interruption. The SFNPs received subsequent to the service interruption can be transmitted from a new gateway (after, for example, a gateway switch), or transmitted via a new communication path, or new satellite, as further described herein.

According to at least one embodiment, the timing markers extrapolated from the timing information can include start of superframe (SOSF) markers. The SOSF markers are used by the terminal to synchronize the timing of the terminal with the gateway. At 216, timing is synchronized between the terminal and gateway based on a difference between the one or more first timing markers and the one or more second timing markers. For example, a timing difference may be determined between SOSF markers extrapolated from SFNPs received before and after the service interruption. Based on the timing difference, a terminal timing offset can be computed for the terminal. The terminal timing offset is used by the terminal to synchronize transmission and reception of data to and from the gateway. Further, a path delay can be determined for a communication path subsequent to the service interruption. The timing can be synchronized based on a combination of the path delay and the terminal timing offset for the terminal. As described herein, the path delay for the communication path is based on time it takes for a signal to traverse from the terminal to the gateway via the satellite. Since the service interruption can be caused by a change in the communication path (due to switching, for example, a gateway, satellite, or beam), determining the path delay for the new communication path enables the terminal to accurately synchronize with the gateway for communications subsequent to the service interruption. Since a total time of travel for data packets including gateway to satellite, satellite to terminal, terminal offset, terminal to satellite, and satellite to gateway is preferably constant, the terminal is configured to determine when to start a transmission within or at a particular frame (e.g. superframe or SOSF). This is particularly relevant for moving terminals, where movement of the terminal is not necessarily known or tracked, but also applies to stationary terminals that experience service interruptions due to changes in communication path. Finally, at 218, data is transmitted and received using the synchronized timing. As can be appreciated, transmitting and receiving data by the terminal can further include requesting uplink resources for data transmission from the terminal based on the synchronized timing.

Figure 3:
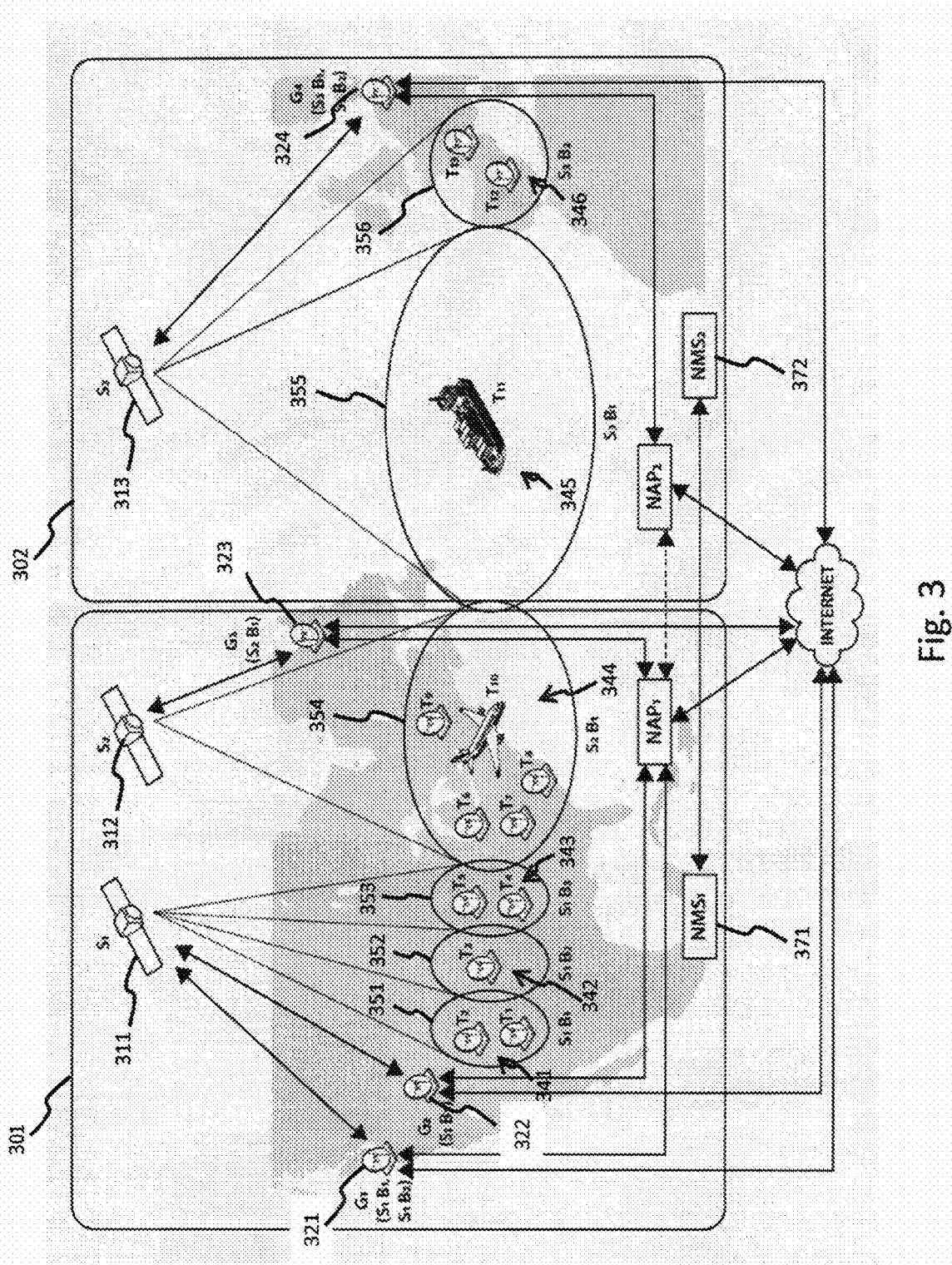
FIG. 3 is a diagram illustrating exemplary communications paths in a satellite system, according to one or more embodiments.

FIG. 3 illustrates exemplary communication paths in two different satellite networks 301 and 302. The satellite communication networks 301 and 302 supports communications between gateways 321, 322, 323, and 324, and terminals 341, 342, 343, 344, 345, and 346 via satellites 311, 312, and 313. As described with respect to system 100, terminals can be configured for relaying traffic between their respective CPEs (not shown herein) and a public or private network such as the internet. Further, gateways 321, 322, 323, 324, similar to gateway 120, can be configured to route traffic from terminals 341-346 across the networks as appropriate. Satellites 311, 312, and 313 serve terminals 341-346 in various geographical service areas via beams 351, 352, 353, 354, 355, and 356 respectively. Further, network 301 can be managed by Network Management System (NMS) 371 and network 302 can be managed by NMS 372. In satellite network 301, satellite 311 deploys beams 351, 352 served by gateway 321, and beam 353 served by gateway 322. Satellite 312 deploys beam 354 served by gateway 323. In network 302, satellite 313 deploys beams 355 and 356 served by gateway 323.

Various causes of service interruptions can be envisioned in this system. A mobile terminal may move from one beam to another beam, and may have to associate with different gateway, while maintaining an association with the same network or a different network. For example, as a terminal 343 switches from beam 353 to beam 354, a communication path between gateway 321, satellite 311, and terminal 343 may be switched to a new communication path between gateway 323, satellite 312, and terminal 343. Further, as a terminal approaches the boundary of network 301, it can request configuration for operation in one or more adjacent visitor networks such as network 302. Thus, as a terminal 344 moves from beam 354 to beam 355, a communication path traversing gateway 323 and satellite 312 may be switched to a new communication path traversing gateway 324 and satellite 313.

A terminal may need to reacquire timing relative to a new gateway after a gateway switchover. For example, a communication path for terminal 341 traversing satellite 311 and gateway 321 may need to be switched to a communication path traversing satellite 311 and gateway 322. The gateway switch may be due to a weather outage at the geographical location of the gateway 321, equipment failure or any other reason. Thus, the disclosed embodiments enable terminals to reacquire timing for a new communication path relative to a switch in a beam, satellite, or gateway, as the terminal moves around in the network coverage area without needing feedback from the gateway. The embodiments described herein (and with respect to following FIG. 4) can use the same technique across different independently managed networks as long as the frame level timing is derived using a common time source.

Figure 4:
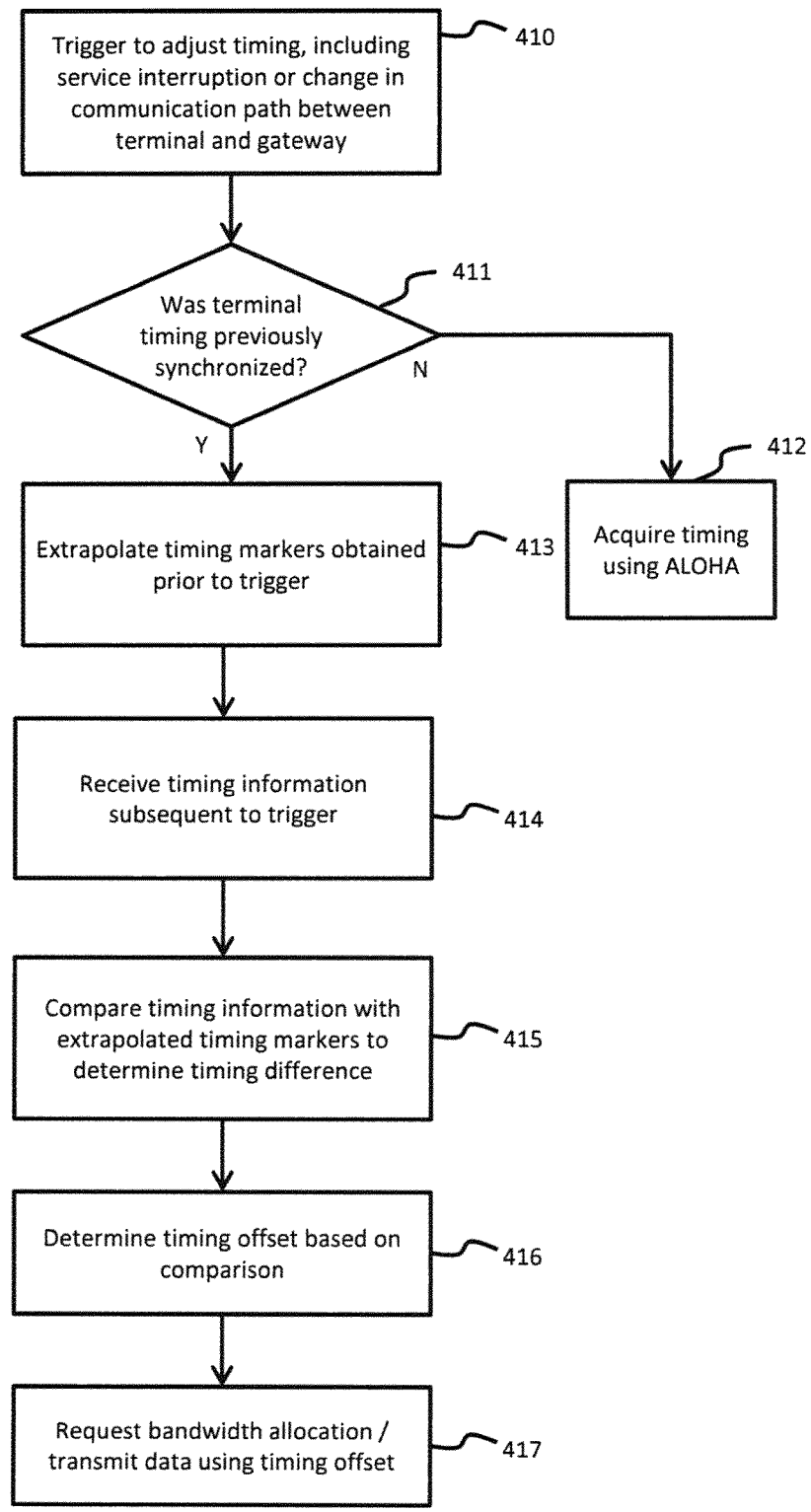
FIG. 4 is a flowchart of a process for synchronizing timing after a service interruption, according to one or more embodiments.

FIG. 4 is a flowchart of a process for synchronizing timing after a service interruption, according to one or more embodiments. The process may be performed by components similar to those illustrated in satellite communication system 100, such as a terminal in communication with a gateway via a satellite. At 410, a trigger is activated to adjust a timing of a terminal. The trigger may be based on a service interruption or change in communication path between the terminal and a gateway. The terminal can include any terminal such as terminals 140 or 145 illustrated in satellite communication system 100. Further, the service interruption can be associated with any of a communication interruption of an existing beam, a switch between beams served by a same gateway, a switch between beams served by different gateways, a switch between beams from different satellites served by the same gateway, a switch between beams from different satellites served by different gateways, a switch to a different network, etc. Any of these scenarios (or other scenarios envisioned by those of ordinary skill in the art in light of this disclosure) may require a timing adjustment and, therefore, trigger the operations described herein. Further, the trigger can comprise any command from the satellite network (e.g. from a gateway) or via detection of a switch at the terminal. For example, the gateway may be in the best position to analyze a signal change, so even if the terminal doesn't detect a change, information sent from the terminal to the gateway (including a new gateway) can enable the gateway to detect if the switch requires generating a trigger or command to the terminal to synchronize its timing.

At 411 it is determined whether or not the terminal was previously synchronized with a gateway. This is useful in determining what type of timing adjustment is needed. For example, if the terminal was well-synchronized with a gateway prior to the service interruption, then it can be instructed to compute the new timing based on the previous timing information according to various embodiments. If the terminal was not synchronized to a gateway, however, then the standard ALOHA (or equivalent) timing request is utilized at 412. If the method proceeds to obtain the timing from past timing information, then at 413 and 414, timing information is extrapolated/obtained before and after the trigger. For example, one or more first timing markers can be extrapolated from timing information received prior to the service interruption. According to an embodiment, the timing information can be contained in superframe numbering packets (SFNPs) received at the terminal.

The SFNPs are transmitted to the terminal from the gateway via one or more beams generated by a satellite. The SFNPs may be transmitted within a short time interval at the beginning of a superframe. This short time interval can include a gateway timing offset. The gateway timing offset can be different depending on different gateways and related entities, as well as different information that is transmitted, internal gateway delays, etc. Further in an embodiment, the timing information can include a delay parameter that indicates the gateway timing offset associated with a previous SFNP. For example, each subsequent SFNP can include a gateway timing offset of the previous SFNP, thereby indicating a time period between a beginning of a superframe and the transmission of the previous SFNP within the superframe.

According to an embodiment, a "delay field" of the SFNP contains the delay parameter. Thus, the one or more first timing markers can be extrapolated from delay parameters in SFNPs received prior to the service interruption. For example, based on the delay parameters in two or more SFNPs, additional timing markers can be extrapolated by the terminal and used to synchronize timing between the terminal and the gateway. The extrapolation can include adding an integer number of superframe time intervals to the last (or previous) accurate SFNP received prior to the service interruption. Further, at 414, one or more second timing markers are extrapolated from timing information received subsequent to the service interruption. For example, delay parameters may be obtained from SFNPs received at the terminal subsequent to the service interruption. The SFNPs received subsequent to the service interruption can be transmitted from a new gateway (after, for example, a gateway switch), or transmitted via a new communication path, or new satellite.

At 415, timing information is compared with the extrapolated timing markers to determine a timing difference. The timing markers extrapolated from the timing information can include start of superframe (SOSF) markers. The SOSF markers are used by the terminal to synchronize the timing of the terminal with the gateway. For example, a timing difference may be determined between SOSF markers extrapolated from SFNPs received before and after the service interruption. The previously-received time markers are extrapolated based on a local clock at the terminal. After receiving SFNP packets from the new gateway (or via a new communication path), the terminal extrapolates the start of the new superframe marker (i.e. SOSF). The difference of the prorated timing from the previous gateway/path to that of new gateway/path thus indicates the difference in path delay from new gateway.

At 416, based on the timing difference, a terminal timing offset can be computed for the terminal. The terminal timing offset is used by the terminal to synchronize transmission and reception of data to and from the gateway. The difference in path delay (or timing difference) can be factored into determining the terminal timing offset value, so that the terminal is aware that it can transmit a data packet at the end of the offset, and a superframe will reach the gateway at the intended time, i.e. synchronized with the gateway timing. Thus, the terminal is able to adjust its offset timing responsive to changes in communication path and/or network switches, without needing to re-synchronize using prior art methods. As described above (and below with reference to FIGS. 5-6), a path delay can be determined for a communication path subsequent to the service interruption, and the timing can be synchronized based on a combination of the path delay and the terminal timing offset for the terminal. At 417, the terminal requests bandwidth allocation, i.e., uplink resources, for data transmission based on the synchronized timing. The terminal subsequently transmits and receives data using the synchronized timing.

Figure 5:
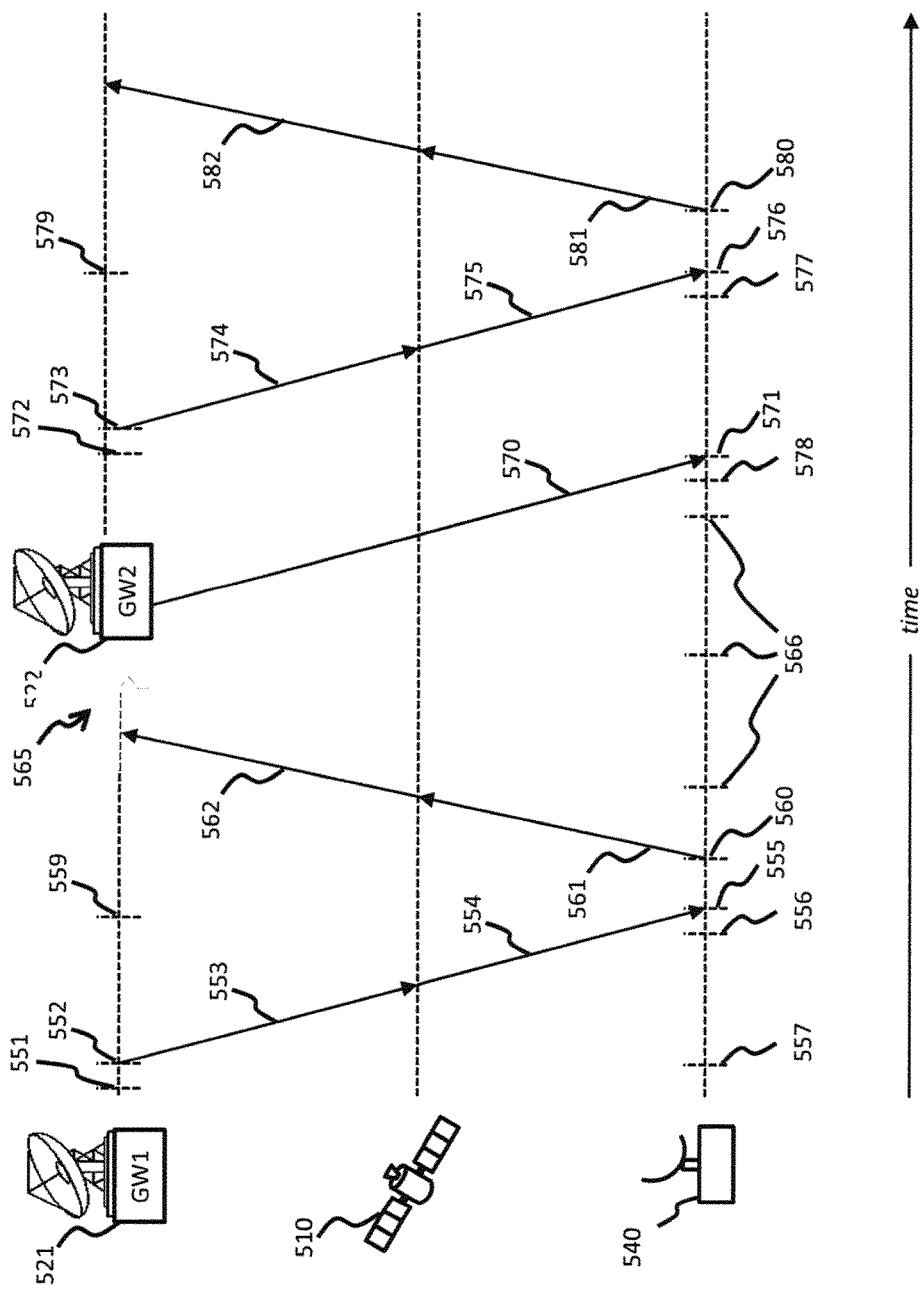
FIG. 5 is a diagram illustrating exemplary synchronization of timing after a service interruption associated with switching gateways, according to one embodiment.

FIG. 5 is a diagram illustrating timing synchronization after a service interruption associated with switching gateways, according to one embodiment. A first gateway 521 and terminal 540 are illustrated as being in communication via satellite 510. A communication interruption 565 occurs as a result of a switch to a second gateway 522. According to at least one embodiment, the gateway 521 can be configured to maintain track of time at the superframe boundary level. It should be noted, however, that any other timing concept or division can be used. Moreover, the SFNP is any packet that has information about frame number and timing. Thus, FIG. 5 illustrates how terminal 540 can extrapolate SOSF markers based on a local clock and compare them with timing information obtained from SNFPs received after the service interruption to determine a timing difference and the path delay associated with the new gateway 522. The embodiment of FIG. 5 is illustrated with reference to a time axis moving from left to right. A superframe begins at a gateway SOSF marker 551 from gateway 521, and after a gateway time offset, a SFNP is transmitted at 552. At 553 the SFNP travels from the gateway 521 to the satellite 510, and travels from the satellite 510 to the terminal 540 at 554. The SFNP is received by the terminal 540 at a time 555. It is assumed that a timing was previously synchronized between terminal 540 and gateway 521 and, thus, the SFNP contains timing information (e.g. delay parameter) associated with an immediately-previously-received SFNP. Terminal 540 can thus extrapolate the first terminal SOSF marker at time 556, and a previous terminal SOSF marker at time 557. The terminal 540 can then transmit an outbound packet at 560, which travels to satellite 510 at 561, and is relayed to gateway 521 at 562. It is therefore assumed that the outbound packet is transmitted in a manner that is synchronous with a timing of gateway 521. Further, a subsequent SFNP is transmitted from gateway 521 at gateway SOSF marker 559, but is not shown herein for clarity. Terminal 540 further extrapolates additional terminal SOSF markers at 566 based thereon (and on previous receptions of SFNPs).

According to the illustrated embodiment, a service interruption occurs at 565, thereby resulting in a change in the communication path to gateway 522. The service interruption generates a trigger for terminal 540 to determine a new timing offset based on previous timing information of SFNPs from gateway 521 in order to synchronize its timing with the new gateway 522. According to an embodiment, synchronizing with the new gateway 522 can include determining a terminal timing offset for the new communication path based on timing information in SFNPs received at terminal 540 from gateway 522. For example, first and second SFNPs from gateway 522 (transmitted at gateway SOSF markers 572 and 579) are received at terminal 540 at times 571 and 576. Additional terminal SOSF markers 578 and 577 can be extrapolated based, for instance, on terminal 540 obtaining a delay parameter from the second SFNP received from gateway 522. The terminal determines the timing difference between the terminal SOSFs markers 566 extrapolated from the previous gateway, with the terminal SOSF markers 577, 578 based on the new gateway offset. The timing difference in this embodiment is between the last terminal SOSF marker 566 closest to 578 and the first received new terminal SOSF marker 578. The timing difference is indicative of, and can be calculated based on the new path delay. The calculation can be based on the following equations, where:

$T_{HO}$: gateway offset time. This is defined as time interval between the ideal instant of transmission of an SFNP at the gateway and the start of reception of a superframe at the gateway. This is also known as space-time offset (STO).

$T_{HS}$: propagation time from gateway to satellite $T_{SR}$: propagation time from satellite to terminal $T_{RO}$: terminal offset time. This is defined as time between "ideal" receipt of $SFNP_N$ at a terminal and the transmit time for the start of transmission for frame N at this terminal.

$T_{RS}$: propagation time from terminal to satellite (same value as $T_{SR}$)

$T_{SH}$: propagation time from satellite to gateway (same value as $T_{HS}$)

$T_{HO521} = T_{HS553} + T_{SR554} + T_{RO1}$ (first terminal offset time)+ $T_{RS561} + T_{SH562}$ (where the numbers are in reference to the embodiment of FIG. 5).

Prior to the service interruption 565, the one-way path delay from the gateway 521 to the terminal 540, while the terminal 540 was attached to the gateway 521 was: $T_{HS553} + T_{SR554}$ Whereas, subsequent to the service interruption 565, the one-way path delay while terminal 540 attached to gateway 522 is: $T_{HS574} + T_{SR575}$ Once the first SOSF marker is established for the gateway 522, if the new path delay can be derived, $T_{RO2}$ (second terminal offset time) can be derived based on that, based on:

$$T_{HO522} = T_{HS574} + T_{SR575} T_{RO2} T_{RS581} + T_{SH582}$$

Based on the above equations:

$$T_{HO522} - T_{HO521} \text{ (i.e. the timing difference)} = T_{HS574} + T_{SR575} + T_{RO2} + T_{RS581} + T_{SH582} - (T_{HS552} + T_{SR554} + T_{RO1} + T_{RS561} + T_{SH562})$$

Since on each gateway, ignoring effect of movements of satellite, gateway and terminal in duration of round-trip delay, the following can be considered to be the same:

$$T_{RS581}=T_{SR575},\ T_{RS561}=T_{SR554},\ T_{HS574}=T_{SH582},\ \text{and}$$
$$T_{HS553}=T_{SH562}$$

Therefore:

$$T_{HO522}-T_{HO521}=2^*(T_{HS574}+T_{SR575})+T_{RO2}-2^*(T_{HS552}+T_{SR554})-T_{RO1}$$

Which can also be written as:

$$T_{RO2}-T_{RO1}=2^*(T_{HS552}+T_{SR554})-2^*(T_{HS574}+T_{SR575})+T_{HO522}-T_{HO521}$$

Figure 6:
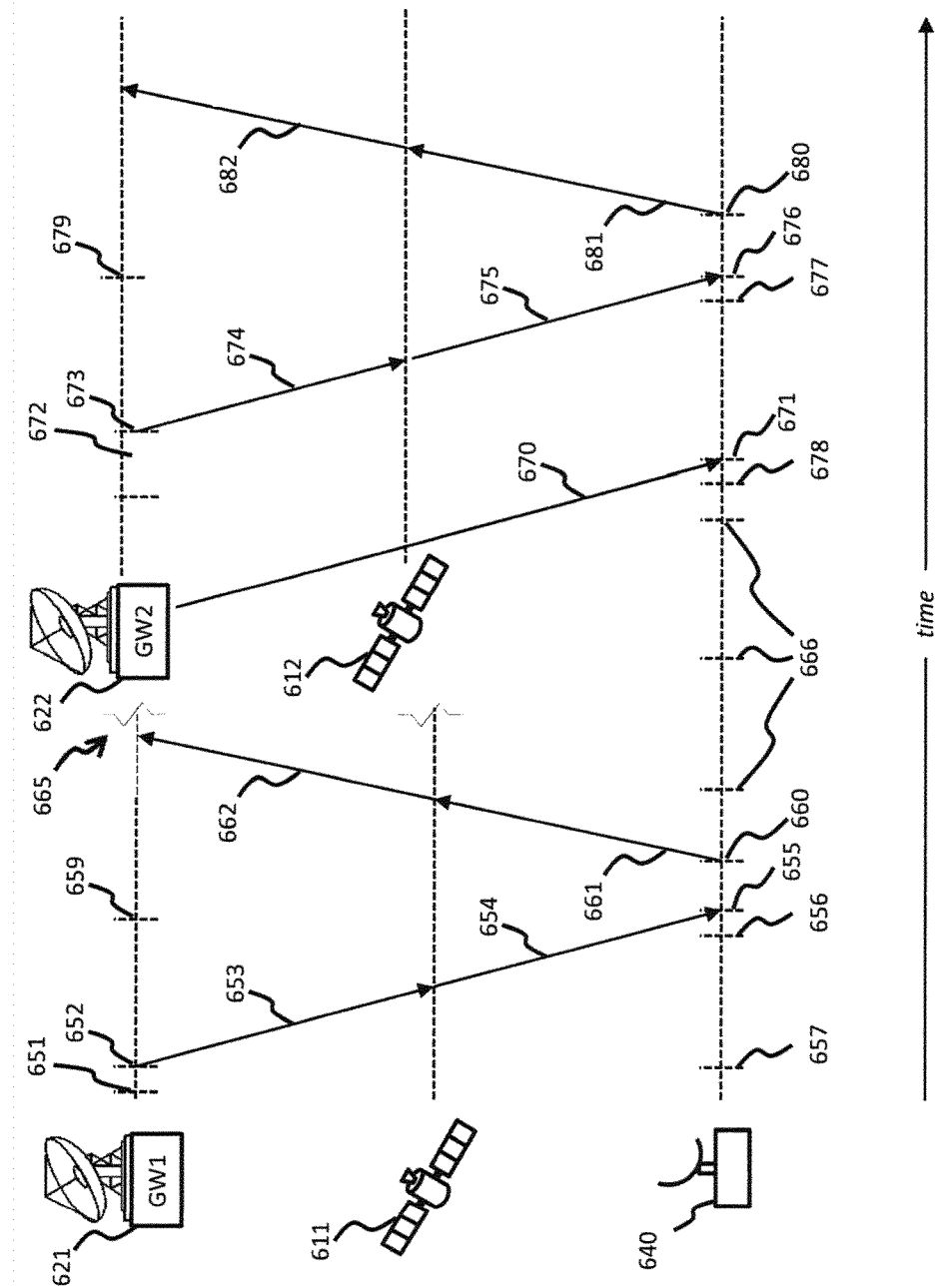
FIG. 6 is a diagram illustrating exemplary synchronization of timing after a service interruption associated with switching satellites and gateways, according to one embodiment.

Since the satellite is the same distance from the terminal, $T_{RS581}$ and $T_{RS561}$ are equal, and the reverse directions are also equal. For purposes of explaining various features, however, they are not cancelled out, because the same formula may be applied to cases where the satellite switches (as shown in FIG. 6).

Thus, the difference in one-way path delays before and after the gateway switch can be represented as:

$$\Delta T=(T_{HS552}+T_{SR554})-(T_{HS574}+T_{SR575})$$

Which implies that:

$$T_{RO2}-T_{RO1}=2^*\Delta T+T_{HO522}-T_{HO521}$$

The new terminal time offset $T_{RO2}$ can be derived from path delay difference and the previous terminal offset $T_{RO1}$ as:

$$T_{RO2}=T_{RO1}+2^*\Delta T+(T_{HO522}-T_{HO521})$$

In other words, the new terminal offset time is equal to the old terminal offset time plus twice the timing difference plus the difference between the new gateway offset time and the old gateway offset time. Note that in the embodiment depicted in FIG. 5, the path delay on the gateway 522 is longer than that on the gateway 521. Hence, ΔT will be negative. In cases where the new beam and old beam are on the same gateway and satellite, ΔT will be 0.

FIG. 6 is a diagram illustrating timing synchronization after a service interruption associated with switching satellites and gateways, according to one embodiment. A first gateway 621 and terminal 640 are illustrated as being in communication via satellite 611. A communication interruption 665 occurs due to a switch to a second gateway 622 and second satellite 612. According to the illustrated embodiment, the gateways are shown maintain track of time at the superframe boundary level, although any other timing points can be used. Thus, FIG. 6 illustrates how terminal 640 can extrapolate SOSF markers based on a local clock and compare them with timing information obtained from SNFPs received after the service interruption to determine a timing difference and the path delay associated with the new gateway 622 and satellite 612. The embodiment of FIG. 6 is illustrated with reference to a time axis moving from left to right. A superframe begins at gateway SOSF marker 621, and after a gateway time offset, a SFNP is transmitted at 652. At 653 the SFNP travels to the satellite 611, and travels to the terminal 640 at 654. The SFNP reaches the terminal 640 at a time 655. It is assumed that a timing was previously synchronized between terminal 640 and gateway 621 and, thus, the SFNP contains timing information (e.g. delay parameter) associated with a most recently received SFNP. Terminal 640 can extrapolate the terminal SOSF marker at a time 656, for example, and a previous terminal SOSF marker at a time 657. The terminal 640 can then transmit an outbound packet at 660, which travels to satellite 610 at 661, and is relayed to gateway 621 at 662. It is therefore assumed that the outbound packet is transmitted in a manner that is synchronous with a timing of gateway 621. Further, a subsequent SFNP is transmitted from gateway 621 at gateway SOSF marker 559, but is not shown herein for clarity. Terminal 640 further extrapolates additional terminal SOSF markers at 666 based thereon (and on previous receptions of SFNPs).

A service interruption at 622 results in a change in communication path to gateway 622 and satellite 612. This generates a trigger for terminal 640 to determine a new timing offset based on previous timing information of SFNPs from gateway 621 in order to synchronize its timing with the new gateway 622. According to one or more embodiments, synchronizing with the new gateway 622 can include determining a terminal timing offset for the new communication path based on timing information in SFNPs received at terminal 640 from gateway 622 via satellite 612. For example, first and second SFNPs from gateway 622 (at SOSF markers 672 and 679) may be received at terminal 640 at times 671 and 676, from which new terminal SOSF markers can be determined at times 678 and 677 (based on, for instance, terminal 640 obtaining a delay parameter from the second SFNP received from gateway 622). The terminal determines the timing difference between the terminal SOSF markers extrapolated from the previous gateway, with the new terminal SOSF markers 678 and 677. The timing difference in this embodiment is between the last terminal SOSF marker 666 and the new terminal SOSF marker 678. The timing difference is calculated based on the new path delay. The calculation can be based on the same equation provided above, which can be summarized as:

$$\Delta T=(T_{HS652}+T_{SR654})-(T_{HS674}+T_{SR675})$$

Which implies that:

$$T_{RO2}-T_{RO1}=2^*\Delta T+T_{HO622}-T_{HO621}$$

The new terminal time offset $T_{RO2}$ can be derived from path delay difference and the previous terminal offset $T_{RO1}$ as:

$$T_{RO2}=T_{RO1}+2^*\Delta T+(T_{HO622}-T_{HO621})$$

Various features described herein may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. For example, such hardware/software/firmware combinations can be incorporated into, or used to implement, the previously described receivers, transmitters, transceivers, terminals, gateway, network management system, fault management unit, modulator/demodulator, etc. Additionally, such hardware can be interfaced to connect and/or facilitate communication between different components such as the automobile infotainment system and receiver. Furthermore, various features can be implemented using algorithms illustrated in the form of flowcharts and accompanying descriptions. Some or all steps associated with such flowcharts can be performed in a sequence independent manner, unless otherwise indicated.

The terms software, computer software, computer program, program code, and application program may be used interchangeably and are generally intended to include any sequence of machine or human recognizable instructions intended to program/configure a computer, processor, server, etc. to perform one or more functions. Such software can be rendered in any appropriate programming language or environment including, without limitation: C, C++, C #, Python, R, Fortran, COBOL, assembly language, markup languages (e.g., HTML, SGML, XML, VoXML), Java, JavaScript, etc. As used herein, the terms processor, microprocessor, digital processor, and CPU are meant generally to include all types of processing devices including, without limitation, single/multi-core microprocessors, digital signal processors (DSPs), reduced instruction set computers (RISC), general-purpose (CISC) processors, gate arrays (e.g., FPGAs), PLDs, reconfigurable compute fabrics (RCFs), array processors, secure microprocessors, and application-specific integrated circuits (ASICs). Such digital processors may be contained on a single unitary IC die, or distributed across multiple components. Such exemplary hardware for implementing the described features are detailed below.

Figure 7:
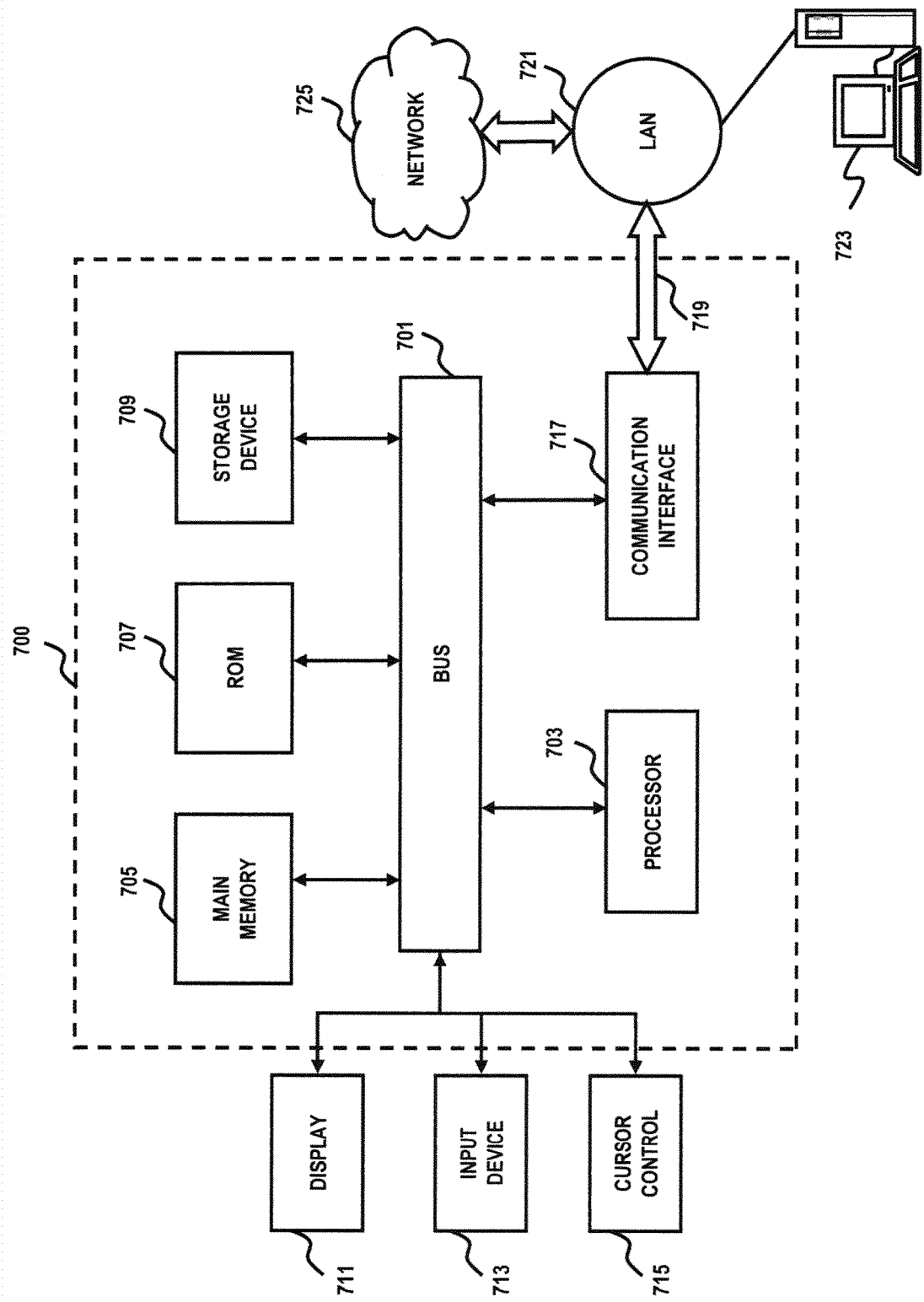
FIG. 7 is a diagram of a computer system that can be used to implement various exemplary features and embodiments.

FIG. 7 is a diagram of a computer system that can be used to implement features of various embodiments. The computer system 700 includes a bus 701 or other communication mechanism for communicating information and a processor 703 coupled to the bus 701 for processing information. The computer system 700 also includes main memory 705, such as a random access memory (RAM), dynamic random access memory (DRAM), synchronous dynamic random access memory (SDRAM), double data rate synchronous dynamic random-access memory (DDR SDRAM), DDR2 SDRAM, DDR3 SDRAM, DDR4 SDRAM, etc., or other dynamic storage device (e.g., flash RAM), coupled to the bus 701 for storing information and instructions to be executed by the processor 703. Main memory 705 can also be used for storing temporary variables or other intermediate information during execution of instructions by the processor 703. The computer system 700 may further include a read only memory (ROM) 707 or other static storage device coupled to the bus 701 for storing static information and instructions for the processor 703. A storage device 709, such as a magnetic disk or optical disk, is coupled to the bus 701 for persistently storing information and instructions.

The computer system 700 may be coupled via the bus 701 to a display 711, such as a light emitting diode (LED) or other flat panel displays, for displaying information to a computer user. An input device 713, such as a keyboard including alphanumeric and other keys, is coupled to the bus 701 for communicating information and command selections to the processor 703. Another type of user input device is a cursor control 715, such as a mouse, a trackball, or cursor direction keys, for communicating direction information and command selections to the processor 703 and for controlling cursor movement on the display 711. Additionally, the display 711 can be touch enabled (i.e., capacitive or resistive) in order facilitate user input via touch or gestures.

According to an exemplary embodiment, the processes described herein are performed by the computer system 700, in response to the processor 703 executing an arrangement of instructions contained in main memory 705. Such instructions can be read into main memory 705 from another computer-readable medium, such as the storage device 709. Execution of the arrangement of instructions contained in main memory 705 causes the processor 703 to perform the process steps described herein. One or more processors in a multiprocessing arrangement may also be employed to execute the instructions contained in main memory 705. In alternative embodiments, hard-wired circuitry may be used in place of or in combination with software instructions to implement exemplary embodiments. Thus, exemplary embodiments are not limited to any specific combination of hardware circuitry and software.

The computer system 700 also includes a communication interface 717 coupled to bus 701. The communication interface 717 provides a two-way data communication coupling to a network link 719 connected to a local network 721. For example, the communication interface 717 may be a digital subscriber line (DSL) card or modem, an integrated services digital network (ISDN) card, a cable modem, fiber optic service (FiOS) line, or any other communication interface to provide a data communication connection to a corresponding type of communication line. As another example, communication interface 717 may be a local area network (LAN) card (e.g. for Ethernet™ or an Asynchronous Transfer Mode (ATM) network) to provide a data communication connection to a compatible LAN. Wireless links can also be implemented. In any such implementation, communication interface 717 sends and receives electrical, electromagnetic, or optical signals that carry digital data streams representing various types of information. Further, the communication interface 717 can include peripheral interface devices, such as a Universal Serial Bus (USB) interface, a High Definition Multimedia Interface (HDMI), etc. Although a single communication interface 717 is depicted in FIG. 7, multiple communication interfaces can also be employed.

The network link 719 typically provides data communication through one or more networks to other data devices. For example, the network link 719 may provide a connection through local network 721 to a host computer 723, which has connectivity to a network 725 such as a wide area network (WAN) or the Internet. The local network 721 and the network 725 both use electrical, electromagnetic, or optical signals to convey information and instructions. The signals through the various networks and the signals on the network link 719 and through the communication interface 717, which communicate digital data with the computer system 700, are exemplary forms of carrier waves bearing the information and instructions.

The computer system 700 can send messages and receive data, including program code, through the network(s), the network link 719, and the communication interface 717. In the Internet example, a server (not shown) might transmit requested code belonging to an application program for implementing an exemplary embodiment through the network 725, the local network 721 and the communication interface 717. The processor 703 may execute the transmitted code while being received and/or store the code in the storage device 709, or other non-volatile storage for later execution. In this manner, the computer system 700 may obtain application code in the form of a carrier wave.

The term "computer-readable medium" as used herein refers to any medium that participates in providing instructions to the processor 703 for execution. Such a medium may take many forms, including but not limited to non-volatile media, volatile media, and transmission media. Non-volatile media include, for example, optical or magnetic disks, such as the storage device 709. Non-volatile media can further include flash drives, USB drives, microSD cards, etc. Volatile media include dynamic memory, such as main memory 705. Transmission media include coaxial cables, copper wire and fiber optics, including the wires that comprise the bus 701. Transmission media can also take the form of acoustic, optical, or electromagnetic waves, such as those generated during radio frequency (RF) and infrared (IR) data communications. Common forms of computer-readable media include, for example, a USB drive, microSD card, hard disk drive, solid state drive, optical disk (e.g., DVD, DVD RW, Blu-ray), or any other medium from which a computer can read.

Figure 8:
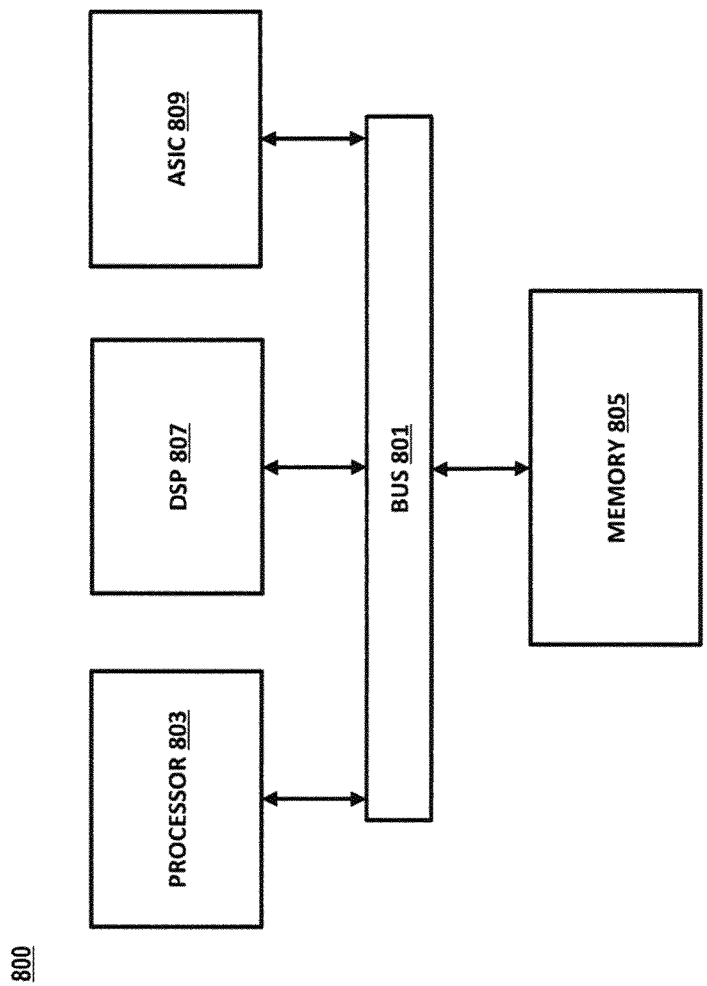
FIG. 8 is a diagram of a chip set that can be used to implement various exemplary features and embodiments.

FIG. 8 illustrates a chip set 800 upon which features of various embodiments may be implemented. Chip set 800 is programmed to implement various features as described herein and includes, for instance, the processor and memory components described with respect to FIG. 8 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 800, or a portion thereof, constitutes a means for performing one or more steps of the figures.

In one embodiment, the chip set 800 includes a communication mechanism such as a bus 801 for passing information among the components of the chip set 800. A processor 803 has connectivity to the bus 801 to execute instructions and process information stored in, for example, a memory 805. The processor 803 may include one or more processing cores with each core configured to perform independently. A multi-core processor enables multiprocessing within a single physical package. Examples of a multi-core processor include two, four, eight, or greater numbers of processing cores. Alternatively or additionally, the processor 803 may include one or more microprocessors configured in tandem via the bus 801 to enable independent execution of instructions, pipelining, and multithreading. The processor 803 may also be accompanied with one or more specialized components to perform certain processing functions and tasks such as one or more digital signal processors (DSP) 807, or one or more application-specific integrated circuits (ASIC) 809. A DSP 807 typically is configured to process real-world signals (e.g., sound) in real time independently of the processor 803. Similarly, an ASIC 809 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 803 and accompanying components have connectivity to the memory 805 via the bus 801. The memory 805 includes both dynamic memory (e.g., RAM, magnetic disk, re-writable optical disk, etc.) and static memory (e.g., ROM, CD-ROM, DVD, BLU-RAY disk, etc.) for storing executable instructions that when executed perform the inventive steps described herein. The memory 805 also stores the data associated with or generated by the execution of the inventive steps.

While certain exemplary embodiments and implementations have been described herein, other embodiments and modifications will be apparent from this description. Accordingly, the various embodiments described are not intended to be limiting, but rather are encompassed by the broader scope of the presented claims and various obvious modifications and equivalent arrangements.

What is claimed is:

1. A method comprising:
   detecting a service interruption at a terminal;
   extrapolating one or more first timing markers from timing information received at the terminal prior to the service interruption;
   extrapolating one or more second timing markers from timing information received at the terminal subsequent to the service interruption;
   synchronizing a timing of the terminal with a gateway based on a timing difference between the one or more first timing markers and the one or more second timing markers; and
   transmitting and receiving data by the terminal using the synchronized timing.

2. The method of claim 1, further comprising determining that the timing of the satellite terminal was previously synchronized as a condition prior to determining the timing difference and synchronizing the timing.

3. The method of claim 1, wherein transmitting and receiving data by the terminal using the synchronized timing further comprises requesting uplink resources for data transmission from the satellite terminal based on the synchronized timing.

4. The method of claim 1, wherein the timing information is contained in superframe numbering packets (SFNPs) received at the terminal.

5. The method of claim 4, wherein the timing information comprises a delay parameter, the delay parameter in each SFNP indicating a gateway timing offset associated with a previous SFNP.

6. The method of claim 5, wherein the one or more first timing markers are extrapolated from delay parameters in SFNPs received prior to the service interruption, and the one or more second timing markers are extrapolated from delay parameters in SFNPs received subsequent to the service interruption.

7. The method of claim 1, wherein synchronizing the timing of the terminal with the gateway based on the timing difference comprises computing a timing offset for the terminal.

8. The method of claim 7, further comprising:
   determining a path delay for a communication path subsequent to the service interruption; and
   synchronizing the timing based on a combination of the path delay and the timing offset.

9. The method of claim 8, wherein the path delay for the communication path is based on a time it takes for a signal to traverse from the terminal to the gateway via the satellite.

10. The method of claim 8, wherein the timing offset is equal to a previous timing offset for the terminal plus twice the timing difference plus a difference between a new gateway offset time and an old gateway offset time.

11. An apparatus, comprising:
    a terminal; and
    a processor coupled to the terminal, the processor being configured to perform operations comprising:
      detecting a service interruption at the terminal;
      extrapolating one or more first timing markers from timing information received at the terminal prior to the service interruption;
      extrapolating one or more second timing markers from timing information received at the terminal subsequent to the service interruption;
      synchronizing a timing of the terminal with a gateway based on a timing difference between the one or more first timing markers and the one or more second timing markers; and
      transmitting and receiving data by the terminal using the synchronized timing.

12. The apparatus of claim 11, wherein the operations further comprise determining that the timing of the satellite terminal was previously synchronized as a condition prior to determining the timing difference and synchronizing the timing.

13. The apparatus of claim 11, wherein transmitting and receiving data by the terminal using the synchronized timing further comprises requesting uplink resources for data transmission from the satellite terminal based on the synchronized timing.

14. The apparatus of claim 11, wherein the timing information is contained in superframe numbering packets (SFNPs) received at the terminal.

15. The apparatus of claim 14, wherein the timing information comprises a delay parameter, the delay parameter in each SFNP indicating a gateway timing offset associated with a previous SFNP.

16. The apparatus of claim 15, wherein the one or more first timing markers are extrapolated from delay parameters in SFNPs received prior to the service interruption, and the one or more second timing markers are extrapolated from delay parameters in SFNPs received subsequent to the service interruption.

17. The apparatus of claim 16, wherein synchronizing the timing of the terminal with the gateway based on the timing difference comprises computing a timing offset for the terminal.

18. The apparatus of claim 17, wherein the operations further comprise:
   determining a path delay for a communication path subsequent to the service interruption; and
   synchronizing the timing based on a combination of the path delay and the timing offset.

19. The apparatus of claim 18, wherein the path delay for the communication path is based on a time it takes for a signal to traverse from the terminal to the gateway via the satellite.

20. The apparatus of claim 18, wherein the timing offset is equal to a previous timing offset for the terminal plus twice the timing difference plus a difference between a new gateway offset time and an old gateway offset time.

* * * * *